INVENTORS.
KENNETH R. OSBORN
DAMON A. PETERSON
JOHN C. SLOAN, JR.
BY Ernest A. Polen
ATTORNEY.

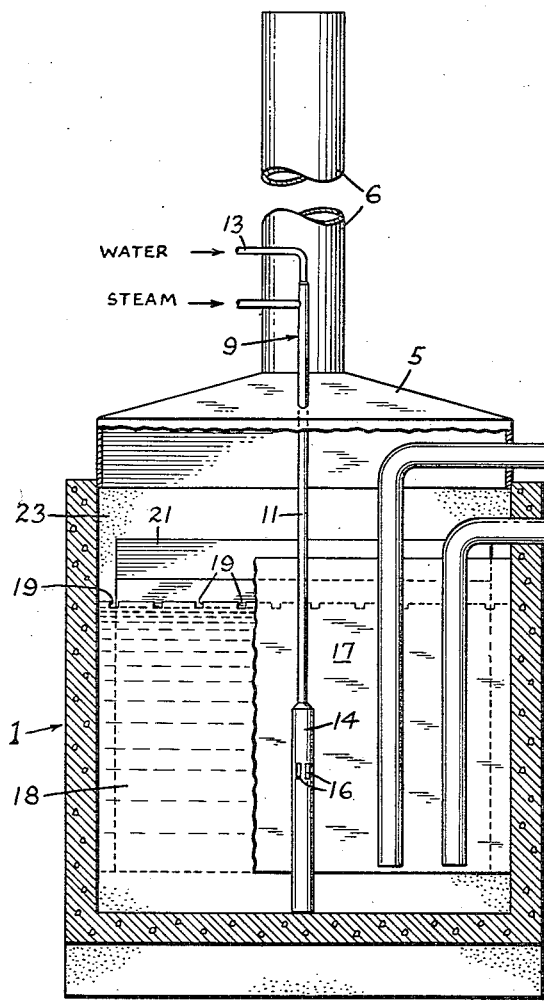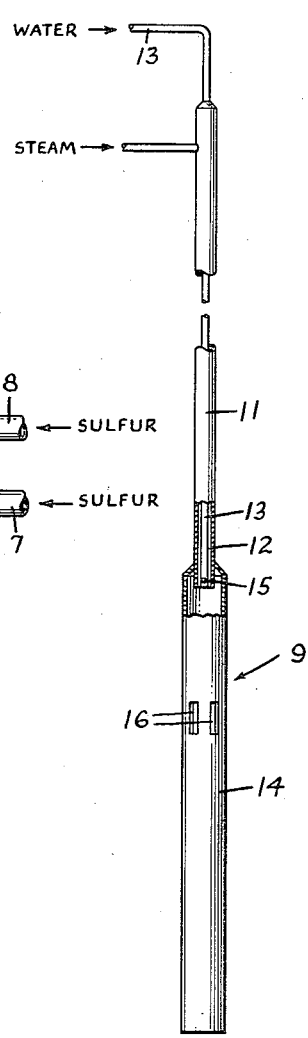
FIG.3.
FIG.4.
INVENTORS.
KENNETH R. OSBORN
DAMON A. PETERSON
JOHN C. SLOAN, JR.
BY Ernest A. Polin
ATTORNEY.

2,767,061

CONTINUOUS PROCESS FOR COOLING LIQUID SULFUR

Kenneth R. Osborn, Scotch Plains, Damon A. Peterson, West Englewood, and John C. Sloan, Jr., Neptune, N. J., assignors to Allied Chemical & Dye Corporation, New York, N. Y., a corporation of New York Application June 2, 1953, Serial No. 359,156

3 Claims. (Cl. 23—224)

This invention relates to improved continuous process and apparatus for cooling liquid sulfur to be subjected to further handling and/or use.

When sulfur is produced from chemicals such as gaseous sulfides, gaseous reaction products containing elemental sulfur may conveniently be contacted with liquid sulfur to condense and extract produced sulfur. It then becomes advisable or necessary to cool the total liquid sulfur prior to recovery of the elemental sulfur product or to recirculation of liquid sulfur into contact with gaseous reaction products, or both. Other instances occur where there is circulation of liquid sulfur to and from a heat producing and cooling zone, as in production of sulfur dioxide by controlled combustion of liquid sulfur.

As the temperature of liquid sulfur is raised, it goes through several changes in viscosity. Between about 245° F., the melting point of sulfur, and about 325° F., the sulfur is fluid and easily handled by conventional equipment. However, at the latter approximate temperature and up to about 550° F., the sulfur is viscous and cannot be handled satisfactorily. From about 550° F., the upper limit of the viscous range, to about 835° F., the boiling point of sulfur, the sulfur once more becomes free flowing.

In the past sulfur has generally been cooled within its lower fluid range by indirect water cooling methods, for example, in shell and tube condensers. For reasons of efficiency of heat exchange and economy of equipment and operation, it is desirable to admit cooling water directly into contact with a body of the liquid sulfur and to achieve cooling throughout that body by resultant evaporation of the water. Prior attempts to accomplish this seemingly simple cooling have resulted in unacceptable behavior of the sulfur, such as formation of crusts and encrusting deposits on equipment and excessive quantities of foam which interfere with satisfactory continuous operation of the cooling equipment. In addition, portions of the cooling water have become partially encased in insulating shells of overcooled sulfur resulting in incomplete utilization of the water and its retention to some extent at least in the cooled sulfur. Incomplete release of the water creates problems in connection with handling and further processing of the liquid sulfur occasioned by delayed release of the entrapped water. It has been suggested that the difficulties encountered be overcome by introducing the water at or near the surface of the body of sulfur being cooled while subjecting the body to violent induced agitation, for example, by a high speed agitator, to effect dispersion of the water as fine droplets throughout the sulfur. Although this procedure tends to reduce entrapment of water, it is not always completely successful is eliminating this effect. Moreover, the induced agitation superadded to that resulting normally from evaporation of the cooling water aggravates the foaming and encrusting problems, in addition to adding to the overall operation the problems and expense of maintaining and operating agitating equipment at high temperature and under conditions favoring formation and accumulation of encrusted sulfur deposits.

A primary object of the invention is to provide a simple and improved continuous process and apparatus for cooling liquid sulfur to a temperature in its lower fluid range. A still further object of the invention is to carry out such continuous process cheaply, without encrustation and excessive foaming, while completely utilizing the cooling effect of the water and avoiding its entrapment. The invention has for further objects such other improvements and such other operative advantages as are reflected in the following description.

We have succeeded in continuously cooling hot liquid sulfur even from temperature above its lower fluid range to temperature within that range while achieving the above objects by introducing the cooling water into a pool of sulfur to be cooled at a sufficient depth below the top surface of the substantially unagitated pool, allowing at least the major portion of the water therein to evaporate, and thereafter retaining the partially cooled sulfur containing residual water in substantially quiescent condition until such water is substantially eliminated therefrom by evaporation. This is effected by simultaneously admitting low velocity streams of liquid sulfur to be cooled and water sufficient to effect the desired cooling to a preliminary cooling zone within which the water is admitted at level below a certain minimum depth, while maintaining the pool contents in substantially unagitated condition except for the agitation naturally resulting from evaporation of the water, retaining the pool contents until at least a major portion of the water evaporates, flowing the partially cooled sulfur from the first zone, preferably from a level lower than that of admission of the water, into a second or retention zone within which the sulfur, again in the form of a pool, is retained in substantially quiescent condition until all or substantially all of the water entrapped therein is released therefrom and disengaged from its surface as steam. The sulfur discharged from the second zone is completely cooled and is then withdrawn in condition for trouble-free handling and processing purposes.

We have found that only if the water is introduced to the first or cooling zone as a low velocity stream at a depth sufficiently below its top surface so that there is little or no formation of sulfur crust at that surface, will the objects of the invention be achieved. The specific minimum depth necessary will vary to some extent with the cumulative rate of introduction of the sulfur to be cooled and of the water necessary to effect complete cooling of the same to desired extent into the cooling pool per square foot of its cross-sectional area, tending to be greater as such cumulative rate increases. In practical operation, such cumulative rate ordinarily lies within the range of 5 to 15 gallons per min./square foot of such area, and under these conditions, the necessary minimum depth is within the range of 3 to 5 feet from the pool surface, usually at least about 3½ feet therefrom. Simple experimentation will determine the minimum depth necessary for any given set of conditions, including the rate of sulfur feed, the cross-sectional area of the cooling zone, the temperature range through which the sulfur is to be cooled, and the quantity of water necessary to effect that cooling. The actual depth may be any distance from the surface of the sulfur equal to or greater than the minimum.

One type of apparatus that may be used in cooling liquid sulfur by the continuous procedure described above comprises three sections or zones, a cooling section adapted to hold the sulfur in a pool, an inlet for water at suitable depth below the surface of the pool and one or more inlets for sulfur preferably below that surface, a second cooling or retention section also adapted to hold the sulfur in a pool, means for discharging sulfur from the first section into the second section, preferably by a path originating from a level below that of introduction of the water, and means for discharging the completely cooled sulfur from the retention section for handling or further processing, preferably by a path originating near the bottom of the retention section.

A concrete embodiment of the invention adapted to cool sulfur supplied at temperatures within both the upper and lower fluid ranges is represented by the accompanying drawings. It is understood, however, that the drawings do not define the limits of the invention but are merely illustrative of its practice, as the design and arrangement of the component elements of the invention may be considerably varied without departure therefrom.

Figure 3 is a diagrammatic sectional elevational view of the apparatus shown in Figure 1 taken along line 3—3, certain parts being broken away to show the interior construction.

Figure 4 is an enlarged detailed view of water lance 9.

Figure 1:
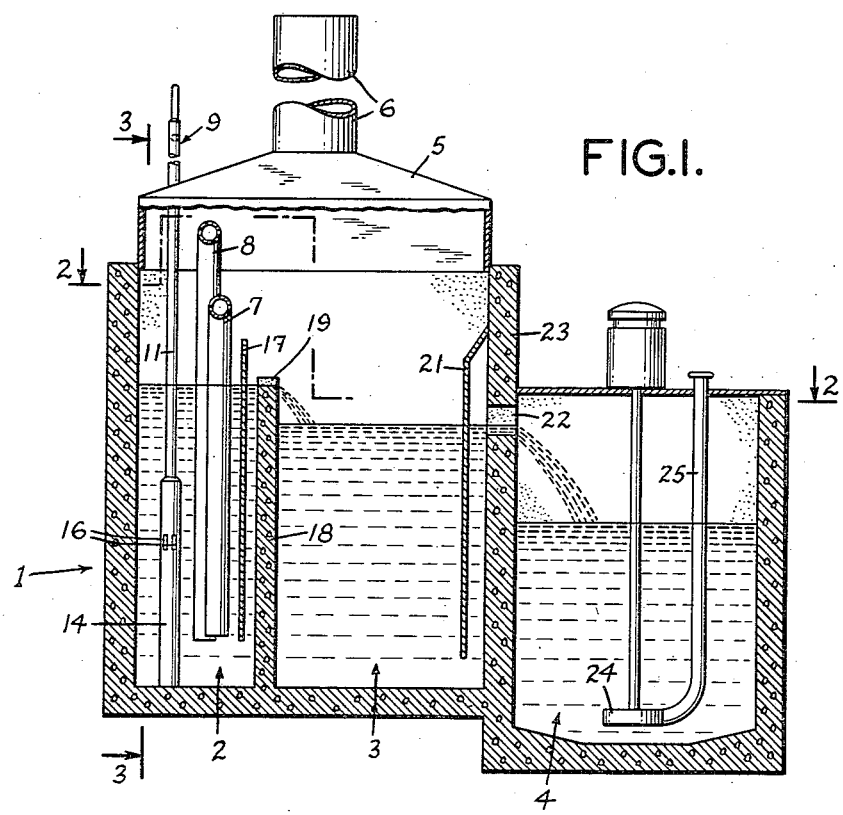
Figure 1 is a diagrammatic sectional elevational view of the apparatus.
Figure 2:
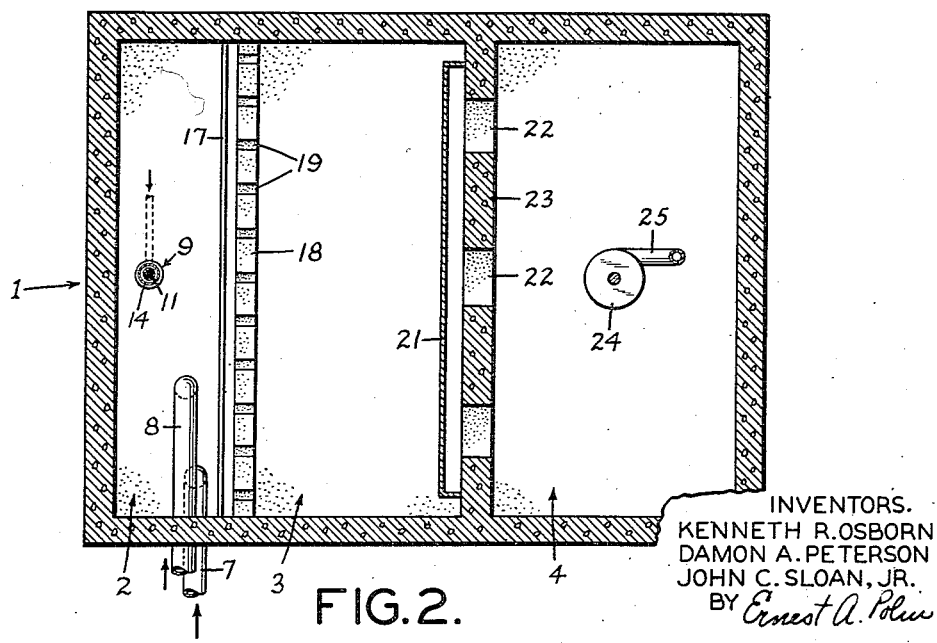
Figure 2 is a sectional plan view of the apparatus shown in Figure 1 taken along line 2—2.

Referring to the drawings, the cooling apparatus or pit designated as 1 is constructed of any suitable material such as concrete. The apparatus is divided into 3 compartments, a cooling section or zone 2, a retention section or zone 3 and a pump section or zone 4. Cooling section 2 and retention section 3 are provided with a hood 5 and a vent stack 6. The hood and stack are designed to allow easy removal to facilitate inspection and maintenance of pit internals.

Circulating liquid sulfur to be cooled, which may be one or more streams of sulfur in its upper or lower fluid ranges, is introduced at low velocity, i. e. in the order of about 5 to 150 feet per minute, into cooling section 2. In the apparatus shown, streams of sulfur in its upper fluid range and lower fluid range pass through lines 7 and 8, respectively, and form a relatively deep pool therein. The depth of the pool is usually at least about 5 feet, and preferably the depth ranges from about 5 to 10 feet. If desired or required, additional inlet lines for sulfur may be provided. After initial formation of the pool, lines 7 and 8 will extend below the top surface of the sulfur. Subsurface addition of the sulfur is preferred when super-atmosphere operating pressures exist within equipment preceding the cooling step which discharges the sulfur to be cooled to provide a seal against such pressures. If such seal is not necessary, the sulfur may be admitted at or adjacent the top surface of the pool.

A stream of water, preferably at a temperature of about 150° to 210° F., is introduced at low velocity, i. e. in the order of 1 to 100 feet per minute, beneath the surface of the sulfur pool in cooling section 2 through a water lance 9 at sufficient rate to obtain the desired cooling effect. The water is introduced at a level sufficiently below the top surface of the pool to prevent formation of sulfur crust thereon. Although such introduction may be near the bottom of the pool, it is preferably at an intermediate level substantially above the same. Upon contact of the water with the liquid sulfur a boiling action occurs as a result of vaporization of the water, producing substantially the only agitation of pool contents encountered in practice of the invention. This agitation extends substantially only upwardly from the level of water admission to leave pool contents therebelow in substantially quiescent condition. Pool contents are retained therein until at least a major portion, usually at least about 90%, of the cooling effect is accomplished. Suitable holding period in cooling zone 2 ranges from about 3 to 12 minutes, preferably at least about 4 minutes. The released steam passes from the cooling section through hood 5 and stack 6.

Once the initial sulfur pool has been formed, continuous operation is carried out by simultaneously introducing low velocity streams of the liquid sulfur to be cooled and water sufficient to effect the desired cooling to cooling zone 2, within which the water is admitted, and usually the sulfur too, at depth below the minimum defined above.

We have found that if the cooling water is not introduced in accordance with the above procedure, a liquid water phase is usually formed on the sulfur surface which leads to formation of sulfur crust.

Water lance 9, as shown in Figure 4, comprises an upper portion 11, provided with a steam jacket 12 and an inner water pipe 13, and a lower unjacketed portion 14. Water enters pipe 13 and is distributed to the sulfur pool through slots 16 in lower unjacketed portion 14. A very small amount of steam is bled from jacket 12 to pipe 13 through a small hole 15 to prevent sulfur blockage during no-flow periods.

The cooled liquid sulfur within the lower and substantially quiescent portion of the pool is drawn under a baffle 17 which extends from a point below the water inlet and preferably near the bottom of the sulfur pool to a point above the top surface of the sulfur and overflows a distributing weir 18 into retention section 3. Baffle 17 serves to prevent short circuiting of water and inadequately cooled sulfur to retention section 3. By use of baffle 17 with sutiable retention time in cooling section 2, the water content of sulfur leaving the same may be readily controlled so as not to exceed quantities conducive to formation of excessive foam and/or crustation in the succeeding or retention section 3. Preferably, the water content of sulfur admitted to the last-named section is below about 0.2%. Weir 18 is preferably provided with a series of notches 19 to enable even distribution of the cooled sulfur over the full width of the weir to the retention section.

In the retention section the partially cooled sulfur is retained in substantially quiescent condition until substantially complete disengagement of the remaining water from sulfur occurs, thereby accomplishing final cooling of the sulfur. Suitable holding period in retention zone 3 ranges from about 3 to 15 minutes, preferably at least about 6 minutes. The vaporized water is passed through hood 5 and stack 6. The resulting sulfur is substantially water-free, generally containing less than about 0.02% by weight of water. We have found that if this retention period is not employed, the cooled sulfur often contains prohibitive amounts of water which tends to become encased in supercooled sulfur and prevents obtainment of substantially water-free cooled sulfur.

The substantially water-free liquid sulfur is drawn from the lower portion of the pool under a baffle 21 and overflows into pump section 4 through openings or ports 22 in a wall 23. Baffle 21 retains any transitory foam induced by evaporation of water within the pool and release of steam from its surface. It is located a short distance from wall 23, extends from a point near the bottom of the sulfur pool to a point above the openings in wall 23 and is sealed at its top to the wall to provide a vapor-tight seal between the retention section and the pump section. The cooled sulfur may then be removed from pump section 4 by means of a pump 24 through line 25.

When it is desired to cool liquid sulfur to temperature in the lower fluid range of sulfur and to use a centrifugal pump for withdrawal of the cooled sulfur, the sulfur, although substantially water-free for practical purposes, sometimes contains enough water, possibly in closely bound form, to cause centrifugal pump failure due to vapor lock (cavitation). Accordingly, in such case, it is preferred in order to prevent cavitation of the centrifugal pump to add to the circulating sulfur a water-soluble surface active agent which reduces the interfacial tension of water and liquid sulfur and is substantially inert to the liquid sulfur, as shown in Sloan application Serial No. 351,861, filed April 29, 1953. Such surface active agent, which is suitably a water-soluble alkyl aryl alkali metal sulfonate, may be added at any stage of the cooling procedure.

Drain ports (not shown) may be provided at the bottom of distributing weir 18 and at the bottom of wall 23. These drain ports may be equipped with cable-operated closures which, when open, allow equalizing levels in the pit sections and permit the entire pit to be emptied by pumping.

Steam coils (not shown) may be provided along the bottom of all pit sections to maintain the sulfur in liquid form during extended shut-down periods.

A thermocouple well (not shown) for measurement of cooled sulfur temperature, may be located at the point where cooled sulfur flows into the pump section.

The invention will be further illustrated by the following specific example:

*Example*

A pool of liquid sulfur about 7 feet deep, having a cross-sectional area of about 27 sq. ft., and containing about 1410 gallons of sulfur at temperature in its lower fluid range is maintained in cooling section 2. Three streams of circulating liquid sulfur are admitted at low velocity beneath the surface of the pool adjacent its bottom through appropriate lines. One stream having temperature of 300° F. is admitted at the rate of about 87 gallons per minute and at velocity of about 132 ft. per minute, the second having a temperature of 307° F. is admitted at the rate of about 133 gallons per minute and at velocity of about 63 ft. per minute, and the third having a temperature of 630° F. is admitted at the rate of about 20 gallons per minute and at velocity of about 10 ft. per minute. The calculated "mix" temperature of the streams is about 328° F. A stream of water at a temperature of 200° F. is simultaneously introduced at a depth of about 3½ feet beneath the surface of the pool at the rate of about 7 gallons per minute and at velocity of about 23 ft. per minute. Boiling of the pool contents occurs above the level of water introduction, and steam exits the top of the pool substantially free of entrained sulfur. After a holding time of about 6 minutes, partially cooled sulfur at a temperature of about 270° F. flows under baffle 17 at a level about 6 feet below pool surface and then flows over distributing weir 18 and enters retention section 3. In the retention section, the partially cooled sulfur is held in substantially quiescent condition for about 9½ minutes, and substantially all of the water still present is vaporized. Essentially water-free sulfur passes through the ports 22 of wall 23 and enters pump section 4. Cooled sulfur at a temperature of 263° F. is withdrawn from the pump section adjacent its bottom by means of pump 24 and line 25 at about 240 gallons per minute and is substantially free of suspended solid or water.

By means of the present invention one or more streams of sulfur in its lower fluid range and/or upper fluid range are economically cooled to a temperature in the lower fluid range of sulfur by a continuous method to obtain substantially water-free cooled liquid sulfur without encountering foaming, sulfur crust or encrustation of water problems. Even if the sulfur to be cooled is in its viscous range or is to be cooled through its viscous range, the present process has been found to permit continuous cooling thereof without operating difficulties to the lower fluid range of sulfur.

While preferred embodiments of the invention have been described, it is understood that these are given to illustrate the fundamental principles involved and not as limiting the scope of the invention to the particular embodiments illustrated.

We claim:

1. A continuous process for cooling liquid sulfur to desired temperature in the lower fluid range of sulfur which comprises concurrently passing low velocity streams of liquid sulfur to be cooled and cooling water sufficient to effect the desired cooling to a first zone containing a pool of liquid sulfur, said pool being maintained at least about 5 feet deep and in substantially unagitated condition except for the agitation naturally resulting from evaporation of the water, introducing the water at a point at least 3 feet below the top surface of the pool so that substantially no formation of sulfur crust thereon results, retaining the mixture of sulfur and water in said pool until at least the major portion of the water evaporates, passing the partially cooled sulfur containing unevaporated water to a second zone containing a pool of sulfur maintained in substantially entirely quiescent condition, retaining the partially cooled sulfur in the second zone until substantially all of the remaining water is vaporized, and then withdrawing the substantially water-free cooled sulfur from the cooling system.

2. A continuous process for cooling liquid sulfur to desired temperature in the lower fluid range of sulfur which comprises concurrently passing low velocity streams of liquid sulfur to be cooled and cooling water sufficient to effect the desired cooling to a first zone containing a pool of liquid sulfur, said pool being maintained at least about 5 feet deep and in substantially unagitated condition except for the agitation naturally resulting from evaporation of the water, introducing the water at a point at least 3 feet below the top surface of the pool so that substantially no formation of sulfur crust thereon results, retaining the mixture of sulfur and water in said pool until at least the major portion of the water evaporates, passing the partially cooled sulfur containing unevaporated water from a level lower than that of admission of the water to a second zone containing a pool of sulfur maintained in substantially entirely quiescent condition, retaining the partially cooled sulfur in the second zone until substantially all of the remaining water is vaporized, and then passing the substantially water-free cooled sulfur to a third zone for withdrawal from the cooling system.

3. A continuous process for cooling liquid sulfur in both its lower and upper fluid ranges to desired temperature in the lower fluid range of sulfur which comprises concurrently passing low velocity streams of lower fluid range and upper fluid range liquid sulfur to be cooled and cooling water sufficient to effect the desired cooling to a first zone containing a pool of liquid sulfur, said pool being maintained at least about 5 feet deep and in substantially unagitated condition except for the agitation naturally resulting from evaporation of the water, introducing the sulfur substantially below the top surface of the pool and introducing the water at a point at least 3½ feet below the top surface of the pool so that substantially no formation of sulfur crust thereon results, retaining the mixture of sulfur and water in said pool until at least the major portion of the water evaporates, passing the partially cooled sulfur containing unevaporated water from a level lower than that of admission of the water to a second zone containing a pool of sulfur maintained in substantially entirely quiescent condition, retaining the partially cooled sulfur in the second zone until substantially all of the remaining water is vaporized, and then passing the substantially water-free sulfur to a third zone for withdrawal from the cooling system.

References Cited in the file of this patent

UNITED STATES PATENTS

| | | |
|---|---|---|
| 1,837,493 | Seil | Dec. 22, 1931 |
| 2,632,691 | Blanchet | Mar. 24, 1953 |

FOREIGN PATENTS

| | | |
|---|---|---|
| 474,191 | Great Britain | Oct. 27, 1937 |